United States Patent
Johnson (10) Patent No.: US 10,218,944 B2
(45) Date of Patent: Feb. 26, 2019

(54) METHODS AND DEVICES FOR INCREASING THE SPECTRAL RESPONSE OF AN IMAGE SENSOR

(71) Applicant: SEMICONDUCTOR COMPONENTS INDUSTRIES, LLC, Phoenix, AZ (US)

(72) Inventor: Richard Scott Johnson, Boise, ID (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 108 days.

(21) Appl. No.: 15/232,946

(22) Filed: Aug. 10, 2016

(65) Prior Publication Data
US 2018/0048871 A1    Feb. 15, 2018

(51) Int. Cl.
| | |
|---|---|
| H04N 5/225 | (2006.01) |
| H04N 5/347 | (2011.01) |
| H04N 9/04 | (2006.01) |
| H04N 9/64 | (2006.01) |

(52) U.S. Cl.
CPC .............. *H04N 9/04* (2013.01); *H04N 5/2254* (2013.01); *H04N 5/347* (2013.01); *H04N 9/045* (2013.01); *H04N 9/646* (2013.01)

(58) Field of Classification Search
CPC .......... H04N 9/04; H04N 9/045; H04N 9/646; H04N 5/2254; H04N 5/347
See application file for complete search history.

(56) References Cited

U.S. PATENT DOCUMENTS

| | | | |
|---|---|---|---|
| 6,137,100 A | 10/2000 | Fossum | |
| 2012/0044394 A1* | 2/2012 | Komiya | H04N 5/3456 348/266 |
| 2013/0153748 A1* | 6/2013 | Suzuki | H01L 27/14607 250/208.1 |
| 2015/0049226 A1* | 2/2015 | Nakata | H04N 5/35554 348/300 |
| 2016/0119559 A1* | 4/2016 | Hsu | H04N 5/35563 348/280 |
| 2017/0013217 A1* | 1/2017 | Lee | H04N 5/35563 |
| 2017/0094243 A1* | 3/2017 | Venkataraman | H04N 13/0007 |

OTHER PUBLICATIONS

Xiaodan Jin et al., Analysis and Processing of Pixel Binning for Color Image Sensor, EURASIP Journal on Advances in Signal Processing, Jun. 21, 2012, pp. 125, Springer Open Journal.

* cited by examiner

*Primary Examiner* — Hung H Lam
(74) *Attorney, Agent, or Firm* — The Noblitt Group, PLLC; Hettie L. Haines (57) ABSTRACT

Various embodiments of the present technology may comprise methods and devices for improving the spectral response of an imaging device. The methods and devices may operate in conjunction with a pixel array and color filter array. The color filter array may comprise pattern of color filters arranged in groups. At least one group may comprise multiple same-color filters and at least one filter of a different color.

19 Claims, 6 Drawing Sheets

METHODS AND DEVICES FOR INCREASING THE SPECTRAL RESPONSE OF AN IMAGE SENSOR

BACKGROUND OF THE TECHNOLOGY

Image sensors utilize a color filter array situated on a pixel array to filter the impinging light according to wavelength. Conventional color filters use a 2×2 pattern of red, green, and blue filters, where the green filters account for 50% of the total area, the red filters account for 25% of the total area, and the blue filters account for 25% of the total area. In order to obtain a full-color image, various demosaicing algorithms and color correction may be utilized to interpolate a set of color values for each pixel.

The spectral sensitivity of an image sensor is the relative efficiency of light detection as a function of wavelength. As pixel size decreases, however, crosstalk negatively influences the signal, as wavelengths intended for one pixel are captured in neighboring pixels and contributing to the wrong signal. Crosstalk diminishes the color signal of the affected color channels and increases the overlap in spectral responses of the different color channels.

To compensate for the increased overlap in spectral responses, intensive color correction can reproduce the diminished color gamut, but may also amplify noise. This leads to overall reduced signal-to-noise ratio (SNR) performance. The color correction matrices suited for image sensors with increased crosstalk sacrifice either color reproduction accuracy or SNR or both. As such, in low-light conditions, the pixel signals are already low and at risk of low SNR, so correcting for full color reproduction further reduces SNR. In bright-light conditions, the pixel signals have ample SNR and the increased noise from full color correction is less consequential.

BRIEF DESCRIPTION OF THE DRAWING FIGURES

A more complete understanding of the present technology may be derived by referring to the detailed description when considered in connection with the following illustrative figures. In the following figures, like reference numbers refer to similar elements and steps throughout the figures.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various color filter arrays, pixel architectures, readout and binning operations, and semiconductor devices, such as transistors, capacitors, and the like, which may carry out a variety of functions. In addition, the present technology may be practiced in conjunction with any number of imaging systems and the apparatus described is merely one exemplary application for the technology. Further, the present technology may employ any number of conventional techniques for capturing light and converting the light into an electric charge, reading out the charge as a pixel signal with a voltage value, sampling the voltage of the pixel signals, converting the analog pixel signal into a digital signal, and the like.

Methods and devices for increasing the spectral response of an image sensor according to various aspects of the present technology may operate in conjunction with any suitable imaging system, such as a computer system, camera system, machine vision system, vehicle navigation system, video telephone, surveillance system, auto focus system, motion detection system, image stabilization system, smartphone, and the like.

Figure 1:
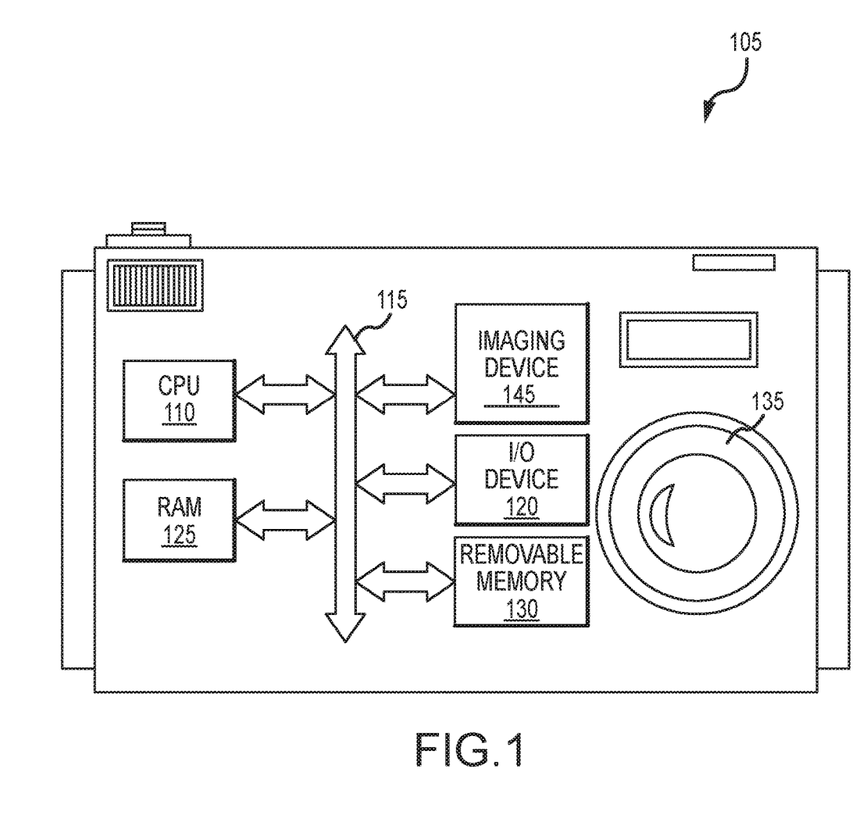
FIG. 1 representatively illustrates a system in accordance with an exemplary embodiment of the present technology.

Referring to FIG. 1, an imaging system according to various aspects of the present invention comprises an electronic device, such as a digital camera 105. In one embodiment, the system may comprise a central processing unit (CPU) 110 that communicates with various devices over a bus 115.

An input/output (I/O) device 120 may be connected to the bus 115 and may provide communication into and out of the system. For example, the I/O device 120 may comprise an external device, such as a computer display, memory card, or some other external unit or interface for connecting to such an external unit. The I/O device 120 may receive digital image data, such as video data, image data, frame data, and/or gain information from an imaging device 145. In other embodiments, the I/O device 120 may comprise an internal device, such as a display screen or a memory component, for directly viewing and/or storing the digital image data.

Other devices connected to the bus 115 provide memory, for example, a random access memory (RAM) 125, hard drive, and one or more removable memory devices 130, such as a floppy disk drive, compact disk (CD) drive, USB drives, memory cards and SD cards. While the bus 115 is illustrated as a single bus, any number of busses may be used to provide communication paths to interconnect the devices.

The imaging system may further comprise the imaging device 145 for capturing image data. For example, light may enter the camera through a lens 135 and strike the imaging device 145. In various embodiments, the lens 135 may be configured to focus an image. For example, the lens 135 may include a fixed and/or adjustable lens and may include micro lenses formed on a surface of the imaging device 145.

The imaging device 145 may detect and convey the information that constitutes an image, for example by converting the variable attenuation of waves (as they pass through or reflect off objects) into electronic signals. The imaging device 145 may be implemented in conjunction with any appropriate technology, such as using semiconductor charge-coupled devices (CCD), active pixel sensors in complementary metal-oxide-semiconductors (CMOS), analog sensors, and/or flat panel detectors.

The imaging device 145 may be combined with a processor, such as the CPU 110, a digital signal processor, or a microprocessor, in a single integrated circuit, or may be on a separate chip. The imaging device 145 may also receive control or other data from the system, such as a shutter release.

Figure 2:
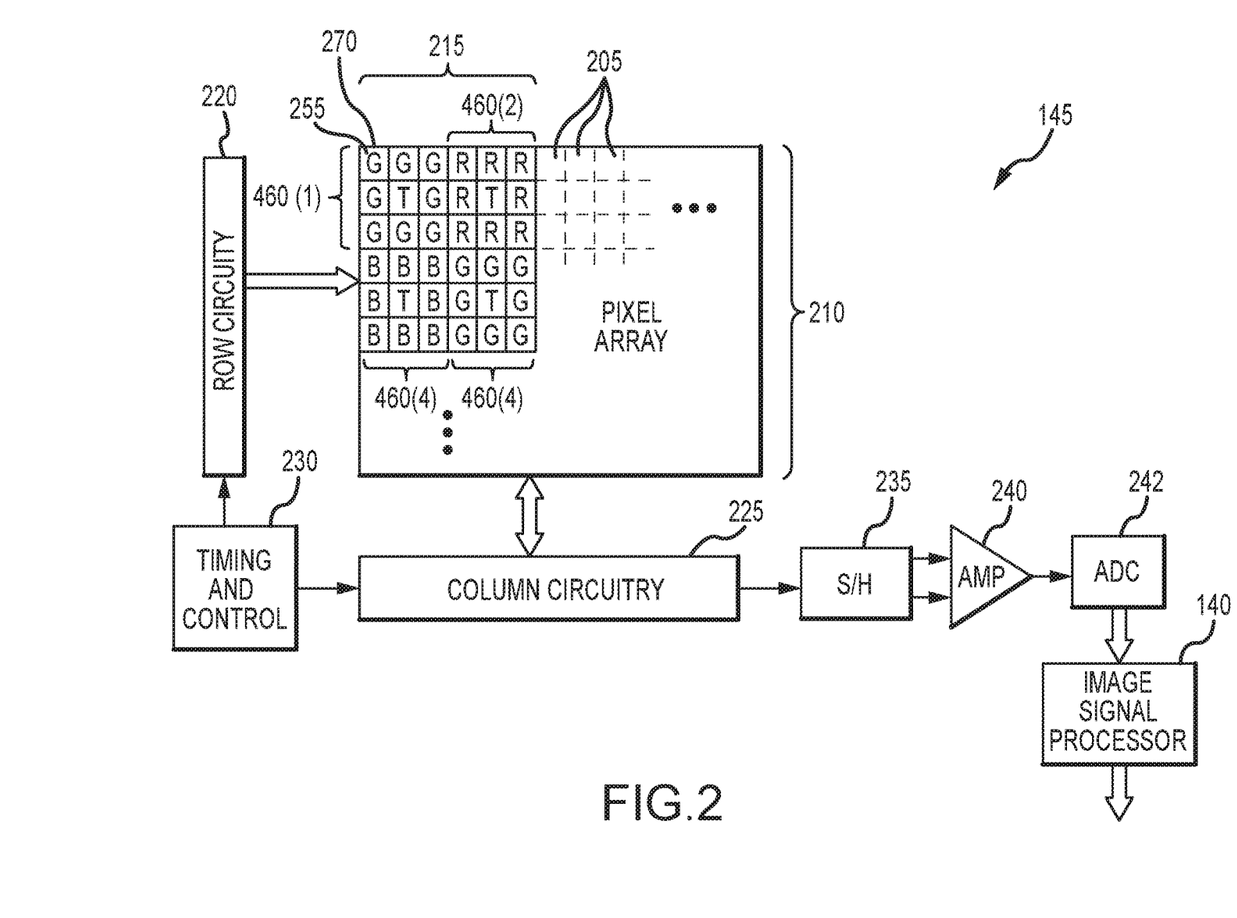
FIG. 2 is a block diagram of an imaging device in accordance with an exemplary embodiment of the present technology.

Referring to FIG. 2, in an exemplary embodiment of the present technology, the imaging device 145 may comprise a plurality of pixels 205 arranged in rows and columns to form a pixel array 210. The pixels 100 may be electrically connected via metal wirings or other suitable connections. The pixel array 210 may be formed in silicon, for example using a suitable complementary metal-oxide semiconductor (CMOS) technology and/or fabrication process.

Figure 3:
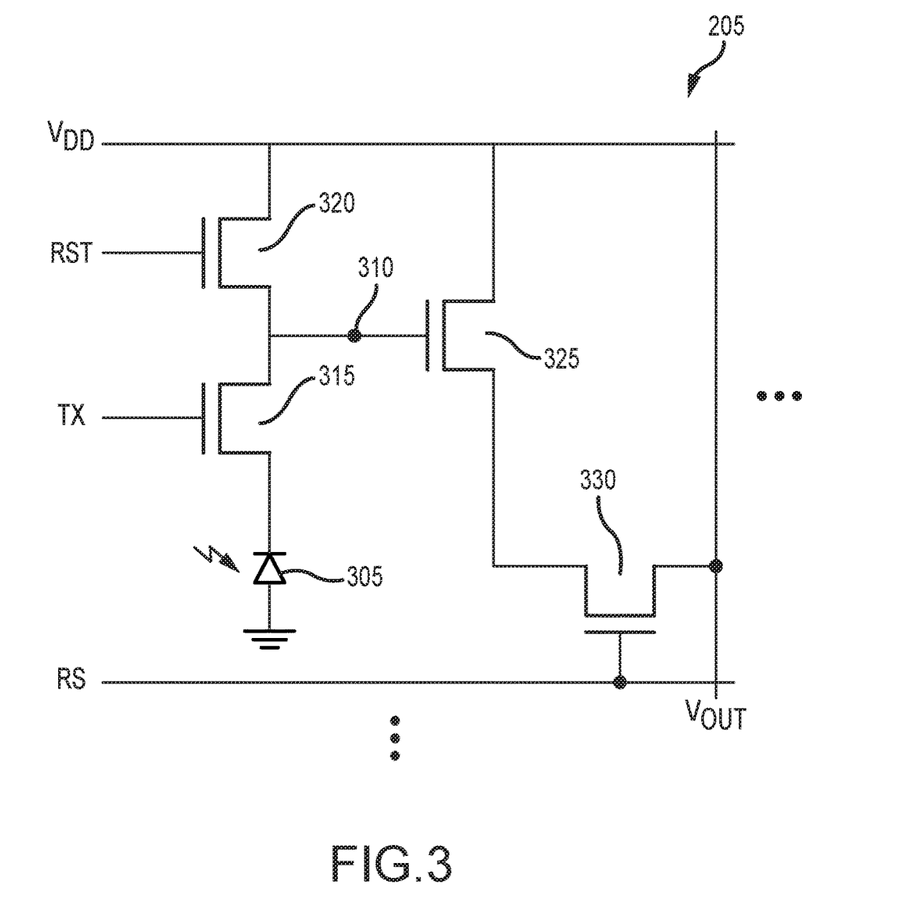
FIG. 3 is a circuit diagram of a pixel in accordance with an exemplary embodiment of the present technology.

Referring to FIG. 3, an exemplary pixel 205 may comprise a photosensitive element 305 and a floating diffusion node 310. In an exemplary embodiment, the photosensitive element 305 operates by converting light into an electric charge and may comprise a photodiode, a photogate, or any other suitable semiconductor device responsive to light. In various embodiments, the photosensitive element 305 may comprise a pinned photodiode capable of being fully depleted at a depletion voltage.

The floating diffusion node 310 (also referred to as a "floating diffusion region" or "FD node") may act as a sensing node and may comprise, for example, a high-conductivity doped region without an ohmic connection into or from which electric charges are transferred. The floating diffusion node 310 may be formed with any device or structure suitable for storing electric charge, such as a diode or capacitor. In various embodiments, the floating diffusion node 310 may be shared by one or more photosensitive elements 305, such that the charge from multiple photosensitive elements 305 may be summed prior to readout.

In the present embodiment, the photosensitive element 305 may be selectively coupled to the floating diffusion node 115 via a transfer gate 315. The transfer gate 315 may comprise a transistor having a gate terminal, a drain terminal, and a source terminal, wherein the gate terminal may be used as a control terminal and the source and drain terminals are used to carry current or transfer charge. For example, the gate terminal of the transfer gate 315 may receive a first control signal TX from a control unit (not shown). In other embodiments, the transfer gate 315 may comprise any other suitable device for providing current flow or charge transfer.

The floating diffusion node 310 may also be selectively coupled to a voltage source $V_{DD}$ via a reset gate 320. The reset gate 320 may comprise a transistor having a gate terminal, a drain terminal, and a source terminal, wherein the gate terminal may be used as a control terminal and the source and drain terminals are used to carry current. For example, the gate terminal of the reset gate 320 may receive a control signal RST from the control unit (not shown).

The pixel 205 may further comprise an amplifier 325 and a row select gate 330. In an exemplary embodiment, the amplifier 325 may comprise a source follower circuit using a transistor having a gate terminal, a drain terminal, and a source terminal. The row select gate 330 may also comprise a transistor having a gate terminal, a drain terminal, and a source terminal, wherein the gate terminal may be used as a control terminal and the source and drain terminals are used to carry current. The gate terminal of the row select gate 330 may receive a row select control signal RS from the control unit. In an exemplary embodiment, the source terminal of the amplifier 325 may couple to the drain terminal of the row select gate 330, for example to transfer the amplified signal from the amplifier 325 to the output $V_{out}$ upon activation of the row select gate 330.

Referring again to FIG. 2, the imaging device 145 may further comprise a color filter array (CFA) 215 comprising a pattern of color filters 255 situated on the pixel array 210. In an exemplary embodiment, each pixel 205 is covered with one color of the CFA 215, and the pixel 205 covered by the color filter may be referred to as a color pixel 270. For example, the CFA 215 may comprise a Bayer color filter array comprising a pattern of red R, blue B, and green G filters. In other embodiments, the CFA 215 may be formed using other colors, such as a CYYM filter (cyan, yellow, and magenta), a CYGM filter (one cyan, yellow, green, and magenta), a RGBE filter (cyan, red, green, and blue), and any other suitable colors. In various embodiments, the CFA 215 may include "white" or transparent color filters. The CFA 215 may form a 9×9 color pattern, a 4×4 color pattern, or any other suitable pattern size and configuration. In various embodiments, the CFA 215 may repeat to cover the entire pixel array 210.

In an embodiment comprising a Bayer CFA, the pixel 205 with the red R filter may be referred to as a "red pixel," the pixel 205 with the blue B filter may be referred to as a "blue pixel," the pixel 205 with the green G filter may be referred to as a "green pixel," and the pixel 205 with the transparent T filter may be referred to as a "transparent pixel."

Referring now to FIGS. 4A-4F, in various embodiments, the color filter array 215 may comprise any number of colors. For example, the color filter array 215 may comprise green (G), red (R), blue (B), and transparent (T) color filters. The red (R) filter passes spectral energy in a red color band, a green (G) filter passes spectral energy in a green color band, a blue (B) filter passes spectral energy in a blue color band, and a transparent (T) filter passes visible spectral energy in all color bands.

In various embodiments, color filters may form groups 460. Each group 460 may comprise a plurality of same-color filters. For example, the color filter array 215 illustrated in FIG. 4A comprises four (4) groups 460(1a), 460(2a), 460(3a), 460(4a), wherein the second and third groups 460(2a), 460(3a) comprise a plurality of red (R) color filters and a plurality of blue (B) color filters, respectively. In various embodiments, the group may further comprise at least one filter of a different color. For example, the first and fourth groups 460(1a), 460(4a) comprise a plurality of green (G) color filters, in this case nine (9) green (G) color filters, and one (1) transparent (T) color filter.

In other embodiments, the color filters may form groups 460 with different shapes, color compositions, and arrangements. For example, referring to FIG. 4B, the color filter array 215 may comprise four (4) groups 460(1b), 460(2b), 460(3b), 460(4b), wherein the first and fourth groups 460(1b), 460(4b) comprise a plurality of green (G) color filters, in this case, ten (10) green (G) color filters and one (1) transparent (T) color filter.

Figure 4A:
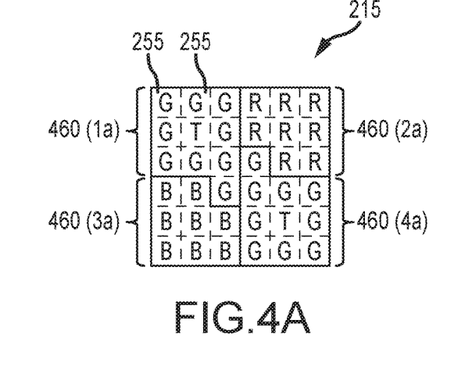
FIGS. 4A-F representatively illustrate color filter array patterns in accordance with exemplary embodiments of the present technology.
Figure 4B:
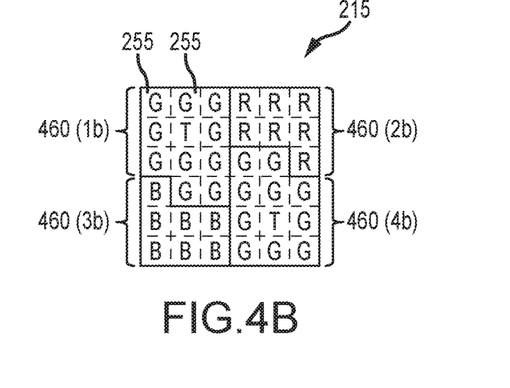

In various embodiments, the group 460 may comprise a majority of same-color filters and at least one (1) different-color filter. For example, the different-color filter may comprise a green (G) color filter, however, in other embodiments, the different-color filter may comprise a transparent (T) color filter. For example, as illustrated in FIG. 4A, the first group 460(1) comprises a majority of green (G) color filters and one (1) transparent (T) color filter. In an alternative embodiment, for example as illustrated in FIG. 4F, the color filter array 215 may comprise four (4) groups 460(1f), 460(2f), 460(3f), 460(4f), wherein each of the first and fourth groups 460(1f), 460(4f) comprises nine (9) green (G) color filters, the second group 460(2f) comprises eight (8) red (R) color filters and one (1) green (G) color filter, and the third group comprises eight (8) blue (B) color filters and one (1) green (G) color filter.

In various embodiments, the group 460 may form an asymmetric shape. For example in FIGS. 4A-B, each group 460 forms a geometric shape with six (6) edges, wherein the edges are not of equal length. In other embodiments, the group 460 may form a symmetric shape, for example as illustrated in FIGS. 4C-F, each group 460 forms a geometric shape with four (4) edges of equal length. In various embodiments, the total area of the group 460 comprising a plurality of green (G) color filters may be greater than that of each of the groups 460 formed by the red (R) and blue (B) color filters. In various embodiments, at least one color filter 255 may be situated in a geometric center of a plurality of filters of another color. For example, FIGS. 4C-F illustrate either one of the transparent (T) color filter or the green (G) color filter located in the geometric center of the group 460.

Referring again to FIG. 2, in various embodiments, the imaging device 145 may further comprise row circuitry 220, column circuitry 225, and a timing and control unit 230, to selectively activate sequential rows of pixels and to read out the pixel signals to a sample-and-hold circuit 235. The pixel signals may be then be transmitted to an amplifier 240 to amplify the signals prior to being converted to digital signals by an analog-to-digital converter 245. The digital pixel signals may then be transmitted and stored in the image signal processor 140 for further processing. Each pixel signal may comprise image data, such as scene illuminance, and row and column identifiers.

The imaging device 145 may further comprise the image signal processor 140. The image signal processor 140 may comprise any number of semiconductor devices, such as transistors, capacitors, and the like, for performing calculations, transmitting and receiving image data, and a storage unit for storing image data. In various embodiments, the image signal processor 140 may be implemented with a programmable logic device, such as a field programmable gate array (FPGA) or any other device with reconfigurable digital circuits. In other embodiments, the image signal processor 140 may be implemented in hardware using non-programmable devices. In alternative embodiments, the image signal processor 140 may be formed partially or entirely within an integrated circuit in silicon using any suitable complementary metal-oxide semiconductor (CMOS) techniques or fabrication processes, in an ASIC, using a processor and memory system, or other suitable implementation.

In various embodiments, the image signal processor 120 may to perform color processing and tone mapping operations, such as demosaicing, white-balance, color correction, gamma correction, and the like.

Referring again to FIG. 3, in various embodiments of pixel-level operation, the photosensitive element 305 and floating diffusion node 310 may be reset by temporarily asserting the reset signal RST and transfer signal TX. The accumulating window (i.e., exposure period) is commenced by de-asserting the transfer signal TX and permitting incident light to charge photosensitive element 305. The voltage or charge on photosensitive element 305 is indicative of the intensity of the light incident on photosensitive element 305 during the exposure period. At the end of the exposure period, the reset signal RST is de-asserted to isolate floating diffusion node 310 and transfer signal TX is asserted to couple photodiode 101 to floating diffusion node 106. The charge transfer causes the voltage of floating diffusion node 310 to drop by an amount proportional to photo-generated electrons accumulated on photosensitive element 305 during the exposure period.

In various embodiments, readout of the image data, via asserting the row select RS signal, may be performed one row at a time along readout column lines Vout or using a variety of other techniques, such as serial readout, column readout along readout row lines, a full parallel readout of all pixels simultaneously, or any other suitable readout technique.

In various embodiments, reset RST, row select RS and transfer signals TX may be generated by the timing and control unit 230 to produce a shutter signal for controlling image acquisition. In one embodiment, the shutter signal is a global shutter signal for simultaneously enabling all pixels within pixel array 210 to simultaneously capture their respective image data during a single acquisition window. In an alternative embodiment, the shutter signal is a rolling shutter signal whereby each row, column, or group of pixels is sequentially enabled during consecutive acquisition windows.

Figure 6:
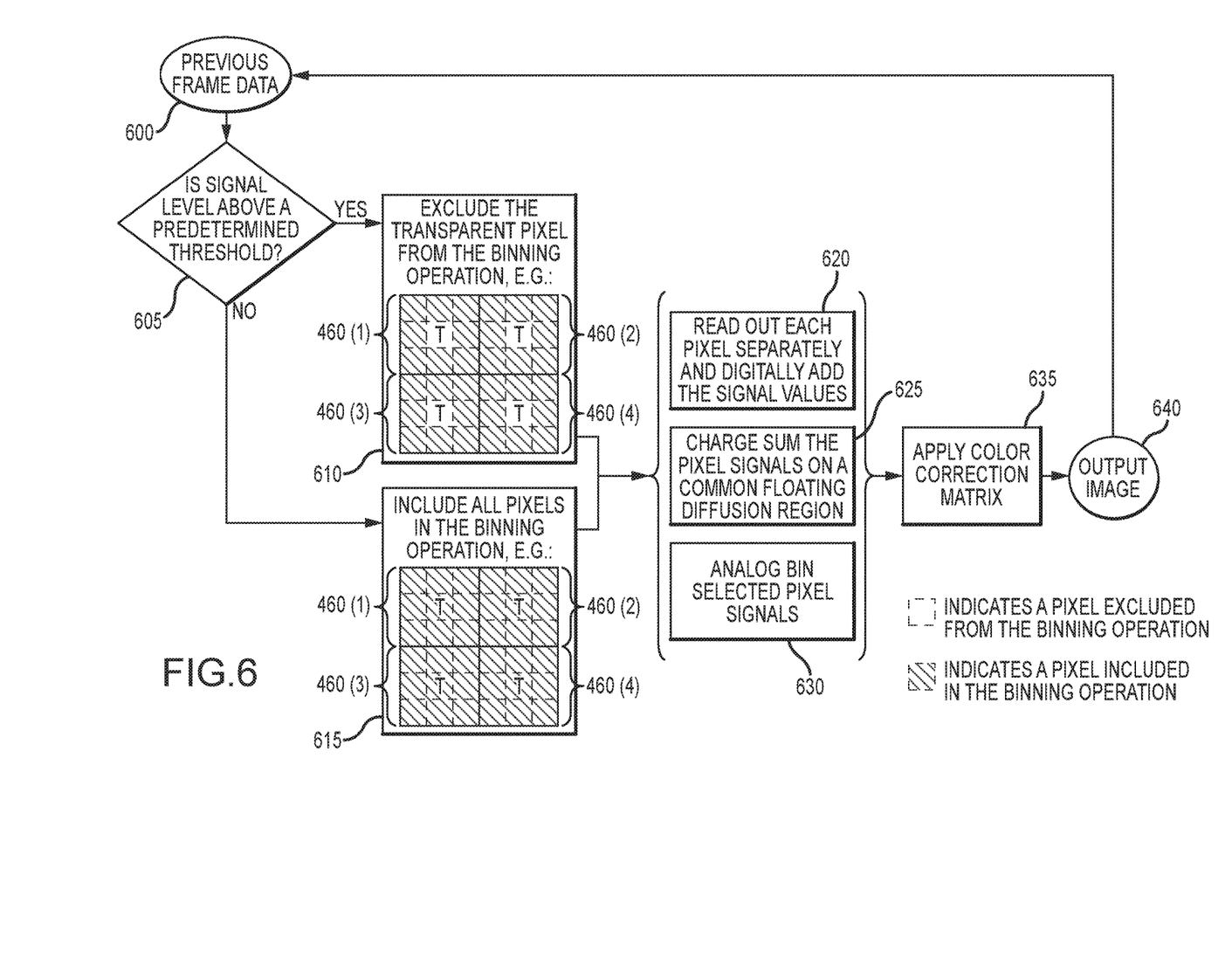
FIG. 6 is a flowchart of a binning process in accordance with exemplary embodiments of the present technology.

Referring to FIG. 6, the pixel signals may be read out and binned (i.e., summed) to increase the dynamic range of the imaging device 145. In various embodiments, pixel signals from a previous frame 600 may be used to determine whether all of the pixel signals in the group will be included in a binning operation. For example, pixel signals from a previous frame 600 may be compared to a predetermined threshold level 605. The threshold level may be selected according to the system components, such as the color reproduction and SNR requirements.

In various embodiments, if the previous frame data 600 is above the predetermined threshold, then only data from a sub-group of the group 460 are selected for binning 610. For example, as illustrated, the pixels with the transparent T filters are not included in the binning operation, but all other pixels within the group 460 are included. In various embodiments, if the previous frame data 600 is not above the predetermined threshold, then all pixels within the group 460 are included in the binning operation 615.

In one embodiment, the binning decision may be applied on a global basis, wherein for each frame, the binning operation is applied identically to every group. In an alternative embodiment, the binning decision may be applied on a per-group basis, wherein for each frame, the binning operation may be performed on some groups but not others.

Once the pixels have been read out, the pixel signals may be binned according to various methods. In one embodiment, the pixel signals may be read out separately and digitally summed after the signals have been converted to a digital value by the ADC 620 (i.e., summing the in a digital domain). In another embodiment, the pixel signals may be summed by collecting and accumulating charge from multiple pixels on a common floating diffusion region 625 (i.e., charge summing). In this case, multiple pixels may share some or all of the readout circuitry. In another embodiment, the analog pixels signals may be read out individually and summed prior to digital conversion 630 (i.e., summing in an analog domain). Summing the analog signals may be performed at any time after readout.

In various embodiments, the pixel signals may be binned on a per-group basis. For example, the color pixel signals from a first pixel group 460(1) may be combined together, the pixel signals from a second pixel group 460(2) may be combined together, the pixel signals from a third pixel group 460(3) may be combined together, and the pixel signals from a fourth pixel group 460(4) may be combined together.

In other embodiments, the pixel signals may be binned between different groups. For example, the transparent pixel signal from one group may be binned with the pixel signals from one or more different groups.

In various embodiments, after the pixel signals have been binned, the image signal processor 140 (FIG. 1) may apply a color correction matrix 635 to the pixel signals (the image) to create a corrected output image 640. In the case where all pixels signals are binned 615, the color correction matrix is applied to optimize the signal-to-noise ratio. In various embodiments, the color correction matrix may under-correct color (leaving saturation lower) to increase the signal to noise ratio. In the case where only a sub-group of pixel signals are binned 610, the color correction matrix is applied to optimize the color fidelity of the group 460.

In various embodiments, the corrected output image 640 may be then be saved or displayed on an output device (not shown). The output device may comprise an external device, such as a computer display, memory card, or some other external unit. The output device may receive digital image data, such as video data, image data, frame data, and/or gain information from the image signal processor 140. The output device may comprise an internal device, such as a display screen or a memory component, for viewing and/or storing the digital image data.

Figure 4C:
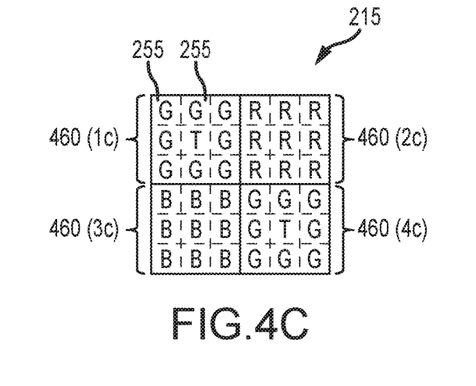
Figure 4D:
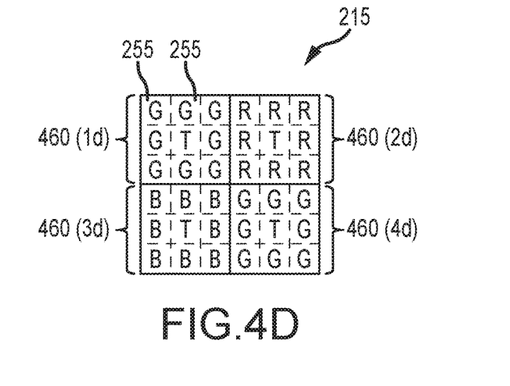
Figure 4E:
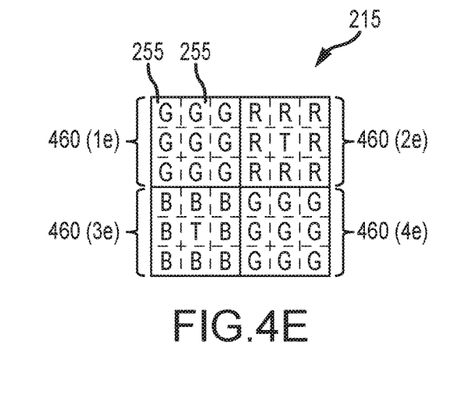
Figure 4F:
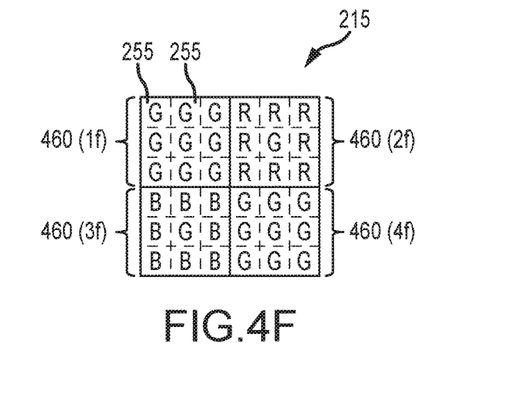
Figure 5A:
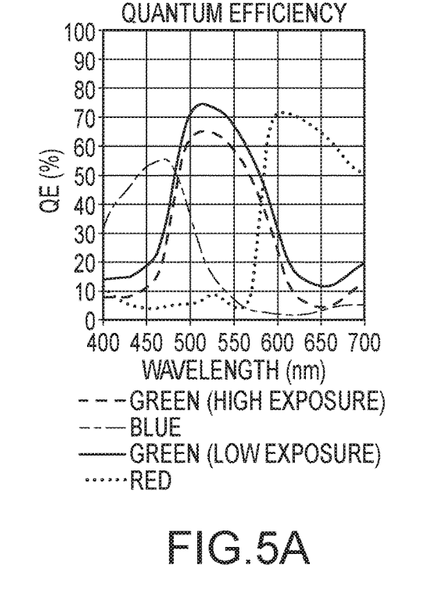
FIGS. 5A-C representatively illustrate the spectral responses of pixel arrays in accordance with exemplary embodiments of the present technology.
Figure 5B:
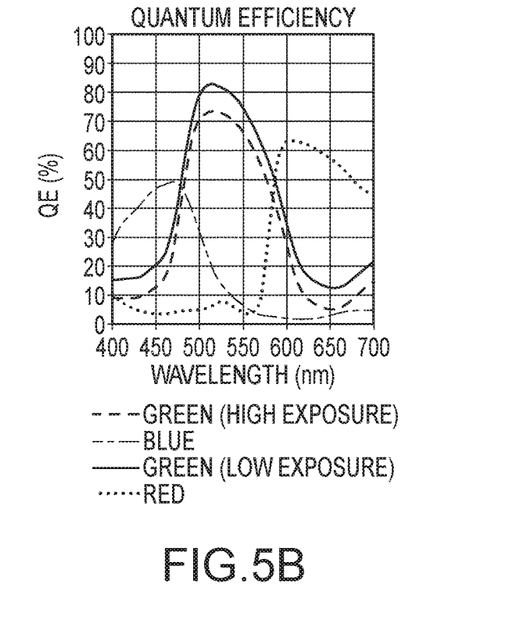
Figure 5C:
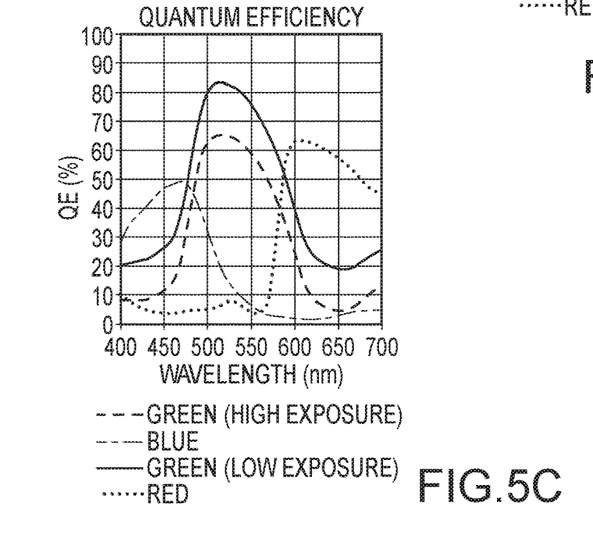

The spectral responses, during testing using computer simulations, for each of the CFA patterns in FIGS. 4C-E are illustrated in FIGS. 5A-C, respectively. FIG. 5A-C are spectral responses showing blue, green, and red sensitivity, wherein the red and blue response is fixed regardless of the signal threshold. The green response changes based on the threshold chosen, where the plots illustrate the green spectral response in high exposure conditions and in low exposure conditions. FIG. 5A illustrates a spectral response wherein the transparent pixel comprises $\frac{1}{9}^{th}$ of two of the groups 460(1c), 460(4c) where the remaining pixels are green pixels. FIG. 5B illustrates a spectral response wherein the transparent pixels comprise $\frac{1}{9}^{th}$ of each of the groups 460(1d), 460(2d), 460(3d), 460(4d) (all color planes), and in low exposure conditions the sensitivity of the transparent pixel is binned only with that of the groups comprising green pixels. FIG. 5C illustrates a spectral response wherein the transparent pixels comprise $\frac{1}{9}^{th}$ of two of the groups 460(2e), 460(3e) (the red and blue color planes), and in low exposure conditions the transparent pixels are binned with the groups comprising green pixels.

In the foregoing description, the technology has been described with reference to specific exemplary embodiments. The particular implementations shown and described are illustrative of the technology and its best mode and are not intended to otherwise limit the scope of the present technology in any way. Indeed, for the sake of brevity, conventional manufacturing, connection, preparation, and other functional aspects of the method and system may not be described in detail. Furthermore, the connecting lines shown in the various figures are intended to represent exemplary functional relationships and/or steps between the various elements. Many alternative or additional functional relationships or physical connections may be present in a practical system.

While the technology has been described with reference to specific exemplary embodiments, various modifications and changes may be made without departing from the scope of the present technology. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any order, unless otherwise expressly specified, and are not limited to the explicit order presented in the specific examples. Additionally, the components and/or elements recited in any apparatus embodiment may be assembled or otherwise operationally configured in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology, as expressed in the following claims.

The invention claimed is:

1. An imaging device, comprising:
   a pixel array; and
   a color filter array situated on the pixel array, wherein the color filter array comprises multiple groups of filters; and
   wherein at least one group comprises:
      a first color and a second color; wherein the second color is selected from the group consisting of transparent and white;
      a majority of filters having the first color; and
      at least one filter having the second color.

2. The imaging device of claim 1, wherein the plurality of filters having the first color forms a shape having only four sides of equal length.

3. The imaging device of claim 1, wherein the filter having the second color is located in a geometric center of the group.

4. The imaging device of claim 1, wherein the the second color is transparent filter.

5. The imaging device of claim 1, wherein the group comprises at least four filters.

6. The imaging device of claim 1, wherein at least one group has a geometric area greater than that of a different group.

7. The imaging device of claim 1, wherein at least one group forms an asymmetric shape.

8. A method for augmenting a spectral response of a pixel array based on lighting conditions, comprising:
   capturing light with an imaging device comprising:
      a plurality of pixels, wherein each pixel comprises a photosensitive element;
      a plurality of multi-color filters situated on the pixel array, wherein the filters are arranged in groups; and wherein at least one group comprises:
         a majority of filters having a first color; and
         at least one filter having a second color;
            wherein the second color is selected from the group consisting of transparent and white;
   obtaining a signal for each pixel, wherein the signal is proportional to the amount of light on the photosensitive element; and
   summing the signals for at least the pixels with same-color filters.

9. The method of claim 8, further comprising selectively enabling the utilization of the pixel signal associated with the color filter having the second color based on a predetermined threshold value.

10. The method of claim 9, further comprising combining the pixel signal associated with the filter having the second color with the pixel signals associated with the filters having the first color.

11. The method of claim 8, wherein summing the signals comprises summing the signals in the group on a shared floating diffusion region.

12. The method of claim 8, wherein summing the signals comprises summing the signals in the group in an analog domain.

13. The method of claim 8, further comprising individually reading out the pixel signals, and wherein summing the signals comprises summing the signals in a digital domain.

14. The method of claim 8, further comprising applying a color correction matrix to the summed pixel signals.

15. A system for producing higher-quality images at varying light levels, comprising:
   a pixel array of color pixels, wherein each pixel comprises a color filter, wherein the color pixels are arranged in groups;
      wherein at least one group comprises:
         at least 9 color pixels from the array of color pixels;
         at most, a first color and a second color;
         a plurality of color pixels from the at least 9 color pixels having the first color; and
         a single color pixel from the at least 9 color pixels having the second color, and wherein the filter having the second color is located in a geometric center of the group;
   an image signal processor coupled to the pixel array, wherein the image signal processor applies a color correction matrix; and
   an output device coupled to the image signal processor for displaying a corrected image.

16. The system of claim 15, further comprising a shared floating diffusion region, wherein multiple pixels corresponding to at least one group of color filters are coupled to the shared floating diffusion region.

17. The system of claim 15, wherein the second color is transparent.

18. The system of claim 15, wherein the color correction matrix optimizes a signal to noise ratio of the corrected image.

19. The system of claim 15, wherein the color correction matrix optimizes the color fidelity of the corrected image.

* * * * *

UNITED STATES PATENT AND TRADEMARK OFFICE
CERTIFICATE OF CORRECTION

PATENT NO. : 10,218,944 B2
APPLICATION NO. : 15/232946
DATED : February 26, 2019
INVENTOR(S) : Richard Scott Johnson Page 1 of 1

It is certified that error appears in the above-identified patent and that said Letters Patent is hereby corrected as shown below:

In the Claims

In Column 8, Claim 4, Line 60, please delete "filter".

In Column 9, Claim 9, Line 20, please delete "color filter" and insert --filter--.

Signed and Sealed this
Seventh Day of May, 2019

Andrei Iancu
*Director of the United States Patent and Trademark Office*